United States Patent
Wieland et al.

(10) Patent No.: US 10,272,519 B2
(45) Date of Patent: Apr. 30, 2019

(54) CONICAL PINS FOR THE STRUCTURAL REPAIR OF DEFECTS

(71) Applicant: Cummins Inc., Columbus, IN (US)

(72) Inventors: Todd M. Wieland, Columbus, IN (US); Terrence M. Shaw, Columbus, IN (US)

(73) Assignee: Cummins Inc., Columbus, IN (US)

( * ) Notice: Subject to any disclaimer, the term of this patent is extended or adjusted under 35 U.S.C. 154(b) by 1013 days.

(21) Appl. No.: 14/278,882

(22) Filed: May 15, 2014

(65) Prior Publication Data

US 2015/0328725 A1 Nov. 19, 2015

(51) Int. Cl.
*B23P 6/04* (2006.01)
*B23K 35/02* (2006.01)
*B23K 20/12* (2006.01)
*B32B 1/00* (2006.01)
(Continued)

(52) U.S. Cl.
CPC .......... *B23K 20/12* (2013.01); *B23K 20/1205* (2013.01); *B23K 35/02* (2013.01); *B23K 35/0222* (2013.01); *B23K 35/36* (2013.01); *B23P 6/04* (2013.01); *B32B 1/00* (2013.01); *B32B 15/00* (2013.01); *B32B 15/01* (2013.01); *B32B 15/04* (2013.01); *B32B 15/043* (2013.01); *Y10T 428/12264* (2015.01); *Y10T 428/12271* (2015.01); *Y10T 428/12278* (2015.01); *Y10T 428/12285* (2015.01); (Continued)

(58) Field of Classification Search
CPC ..... Y10T 428/12389; Y10T 428/12896; Y10T 428/12917; Y10T 428/12396; Y10T 428/12264; Y10T 428/12271; Y10T 428/12278; Y10T 428/12285; Y10T 428/12354; Y10T 428/12757; Y10T 428/12799; Y10T 428/12792; Y10T 428/12882; Y10T 428/12924; Y10T 428/12937; Y10T 428/12965; Y10T 428/12972; Y10T 428/12986; B32B 15/00; B32B 1/00; B32B 15/01; B32B 15/04; B32B 15/043
See application file for complete search history.

(56) References Cited

U.S. PATENT DOCUMENTS 2,502,291 A 3/1950 Taylor
5,144,412 A * 9/1992 Chang .................. H01L 21/486
257/665
(Continued)

FOREIGN PATENT DOCUMENTS

DE 24 06 828 8/1975

*Primary Examiner* — Michael E. La Villa
(74) *Attorney, Agent, or Firm* — Faegre Baker Daniels LLP (57) ABSTRACT

A pin comprising a conical body having a central axis and a cross-sectional area that decreases with distance from a first end to a second end. A coating applied to the conical body has a melting temperature that is lower than a melting temperature of the conical body. The coating melting temperature is lower than a friction temperature and the body melting temperature is higher than the friction temperature. The friction temperature is achieved at an interface of the pin and a component when the pin is forcibly positioned into the component to repair a defect. The coating comprises a material having a first tensile strength value of a bond formed between the conical body and the component in response to softening and rehardening of the coating.

13 Claims, 7 Drawing Sheets (51) Int. Cl.
  *B32B 15/00*    (2006.01)
  *B32B 15/04*    (2006.01)
  *B32B 15/01*    (2006.01)
  *B23K 35/36*    (2006.01)

(52) U.S. Cl.
  CPC ............... *Y10T 428/12354* (2015.01); *Y10T 428/12389* (2015.01); *Y10T 428/12396* (2015.01); *Y10T 428/12757* (2015.01); *Y10T 428/12792* (2015.01); *Y10T 428/12799* (2015.01); *Y10T 428/12882* (2015.01); *Y10T 428/12896* (2015.01); *Y10T 428/12917* (2015.01); *Y10T 428/12924* (2015.01); *Y10T 428/12937* (2015.01); *Y10T 428/12965* (2015.01); *Y10T 428/12972* (2015.01); *Y10T 428/12986* (2015.01)

(56) References Cited

U.S. PATENT DOCUMENTS

| | | |
|---|---|---|
| 6,071,051 A | 6/2000 | Reed |
| 6,386,419 B2 | 5/2002 | Coletta et al. |
| 6,413,650 B1 * | 7/2002 | Dupree ............... B23P 6/005 428/577 |
| 6,460,750 B1 | 10/2002 | Coletta et al. |
| 6,742,697 B2 | 6/2004 | McTernan et al. |
| 6,892,924 B2 | 5/2005 | Stevenson et al. |
| 7,165,710 B2 | 1/2007 | O'Banion |
| 2010/0038412 A1 * | 2/2010 | Huang ............... B23K 35/3033 228/262.9 |
| 2013/0082095 A1 * | 4/2013 | Ho ............... H05K 3/3489 228/224 |

* cited by examiner

CONICAL PINS FOR THE STRUCTURAL REPAIR OF DEFECTS

TECHNICAL FIELD

The present disclosure relates generally to repairing defects in components and, more specifically, to using coated or uncoated conical pins for the structural repair of such defects such that the repair has a high tensile strength.

BACKGROUND

In general, iron casting is frequently selected to be used to build heavy equipment in a variety of industries. Cast iron and other materials have a wide range of applications and are used in pipes, machines, and automotive industry parts, to name a few. Such materials are used in making machine parts where tensile strength is critical such as internal combustion engine cylinder heads, cylinder blocks, brackets and other components. With all the benefits of using materials such as cast iron, some limitations exist when repairing machinery made of cast iron and similar materials. In large and small machines, the industry currently scraps a significant amount (millions of dollars) of iron castings having defects each year, thereby creating a need in the art for apparatuses and methods which permit repair of cracked or defective components such that the repair has high tensile strength.

Typically, traditional mechanical methods employed for the repair of components with defects either require application of too much separating load on the repaired component resulting in an increased risk of progressive damage, or the repair lacks the required tensile strength resulting in inadequate repairs. The use of threaded pins for repairing cracked structures according to conventional techniques, for example, applies a separating load to the repaired part resulting in an increase in the risk of progressive damage. Lock-N-Stitch threaded repair pins create a small drawing together load, but the strength of the repair is low (i.e., less than the tensile strength of the base material being repaired), and therefore unsatisfactory. One method, Friction Stir Processing, creates at best a very low tensile strength bond because graphite flakes in cast iron segregate and align during the process, creating a zone of weakness adjacent the repair area that reduces the joint strength. Another method, welding, generally introduces a great deal of heat over long periods of time, which results in geometric distortion, additional cracking and/or excessive hardness. Another defect repair method, brazing, can deliver a tensile strength approaching the tensile strength of the base material being repaired, but with at least two substantial limitations. First, the quality of brazing is dependent on the surface cleanliness, which may be difficult to control in industrial environments, and second, brazing requires a very large amount of heat to be added to the base material over a very long time scale which may alter the metal structure of the repaired component and leave high residual stresses, an undesirable and unsatisfactory result.

Thus, there remains a need in the art for an apparatus and method which permits repair of cracked or damaged components such that the repair has high tensile strength without unacceptable distortion of or metallurgical damage to the components.

SUMMARY

In one embodiment, the present disclosure provides a pin comprising, a conical body having a central axis and a cross-sectional area at a first end that is less than a cross-sectional area at a second end, and a coating applied to the conical body and having a first melting temperature that is lower than a second melting temperature of the conical body, wherein the first melting temperature is lower than a friction temperature and wherein the second melting temperature is higher than the friction temperature, the friction temperature comprising a temperature value achieved at an interface of the pin and a base material of the component when the pin is forcibly positioned into a hole formed in the component, and wherein the coating comprises a material having a bond strength value comprising a first tensile strength value of a bond formed between the conical body and the at least one of a base material and another pin in response to softening and rehardening of the coating, the first tensile strength value being sufficiently high to restore an original function of the base material at the hole. According to one aspect of this embodiment, the conical body comprises a solid metal core having a first thermal expansion characteristic that is substantially the same as a second thermal expansion characteristic of the base material. In another aspect of this embodiment, the second melting temperature comprises a brazing range temperature value. Another aspect of this embodiment further comprises a flux layer applied to the coating. In yet another aspect of this embodiment, the coating further comprises a variable thickness, the variable thickness including at least one thickened portion. In variant of this aspect, the at least one thickened portion comprises at least one protrusion formed by the coating.

In another embodiment of the present disclosure, an article of manufacture is provided comprising a generalized cone body comprising a first end and a second end, the generalized cone body having a decreasing cross-sectional area from the first end to the second end, the generalized cone body comprising a second melting temperature, a coating coupled to a boundary of the generalized cone body, the coating comprising a first melting temperature that is lower than the second melting temperature and a friction temperature, wherein the friction temperature comprises a temperature value achieved at an interface of the coating and a component when the generalized cone body is forcibly positioned into the component to repair a defect, wherein the first melting temperature is greater than an operating temperature of the component. According to one aspect of this embodiment, the generalized cone body comprises a cross-sectional shape selected from the cross-sectional shapes consisting of: a circle, an ellipse, a polygon, and a non-convex set. According to another aspect of this embodiment, the generalized cone body has an outer surface between the first end and the second end that is irregular. According to yet another aspect, the generalized cone body comprises a drive element adjacent the first end, the drive element being configured to cooperate with a tool to cause rotation of the generalized cone body into a conical hole, and to break in response to torque applied to the drive element by the tool in excess of a predetermined limit. According to variant of this aspect, the generalized cone body comprises a surface geometry that enhances rapid heat-up when the generalized cone body is rotated into the conical hole.

In another embodiment, a method is provided comprising creating a void at a location of a defect in a component to remove the defect, creating an insert of a shape and a size corresponding to the void, inserting the insert into the void, creating a first plurality of conical holes along a perimeter of the insert, a spacing between adjacent conical holes being less than a diameter of a conical hole at a surface of the component, forcibly positioning a first plurality of conical pins into the first plurality of conical holes, forming a bond between each of the first plurality of conical pins and a corresponding one of the first plurality of conical holes in response to forcibly positioning each of the first plurality of conical pins into the corresponding one of the first plurality of conical holes, for each of the first plurality of conical pins, stopping the forcible positioning after a coating on the first plurality of conical pins locally plasticizes creating a high tensile strength bond between the pin, the component, and the insert in response to softening and hardening of the coating, creating a second plurality of conical holes along the perimeter of the insert, each of the second plurality of conical holes overlapping adjacent conical holes of the first plurality of conical holes, forcibly positioning a second plurality of conical pins into the second plurality of conical holes, forming a bond between each of the second plurality of conical pins and a corresponding one of the second plurality of conical holes in response to forcibly positioning each of the second plurality of conical pins into the corresponding one of the second plurality of conical holes, for each of the second plurality of conical pins, stopping the forcibly positioning after a coating on the second plurality of conical pins locally plasticizes creating a high tensile strength bond between the pin, the component, and the insert in response to softening and hardening of the coating, and removing portions of the first and second plurality of conical pins extending above the surface of the component. One aspect of this embodiment further comprises removing surface contamination from a conical hole, wherein removing comprises applying a flux layer to the coating of a conical pin and using a relative motion between the conical pin and the conical hole. According to another aspect of this embodiment, each of the first plurality of conical pins and the second plurality of conical pins has a size and a cone angle that is different from a size and a cone angle of a corresponding conical hole. According to yet another aspect of this embodiment, forcibly positioning comprises applying a torque to a drive element of a conical pin and applying a thrust load to the pin along an axis of the pin. According to variant of this aspect of the embodiment, applying a torque comprises breaking the drive element when the applied torque exceeds a predetermined limit.

In yet another embodiment of the present disclosure, a method is provided comprising creating a conical hole at a location of a defect in a component, driving a conical pin into the conical hole, forming a bond between the component and the conical pin in response to heat generated from friction, and removing a portion of the conical pin extending from the conical hole. One aspect of this embodiment further comprises applying a coating to one of the conical pin and a surface of the conical hole before driving the conical pin into the conical hole. A variant of this aspect further comprising removing surface contamination from the conical hole, wherein removing comprises applying a flux layer to the coating and using a relative motion between the conical pin and the conical hole. According to another aspect of the embodiment, the conical pin has a size and a cone angle that is different from a size and a cone angle of the conical hole. According to yet another aspect of the embodiment, driving the conical pin comprises rotating the conical pin into the conical hole in response to applying a torque to a drive element of the conical pin and applying a thrust load to the pin along an axis of the pin. A variant of this aspect further comprising breaking the drive element in response to applying a torque that exceeds a predetermined limit.

In still another embodiment a component is provided comprising a base material forming a portion of the component, at least one conical pin driven into a conical hole formed at a location of a repaired defect in the component, the conical pin comprising a coating having a first melting temperature that is lower than a second melting temperature of a body of the conical pin, wherein the first melting temperature is lower than a friction temperature and wherein the second melting temperature is higher than friction temperature, the friction temperature comprising a temperature value achieved at an interface of the conical pin and the component when the conical pin is forcibly positioned into the conical hole, wherein the coating is comprised of material that softens at temperatures at or above the first melting temperature and rehardens when the temperature of the coating subsequently falls below the first melting temperature to form a bond between the component and the at least one conical pin.

BRIEF DESCRIPTION OF THE DRAWINGS

The above-mentioned and other features of this disclosure and the manner of obtaining them will become more apparent and the disclosure itself will be better understood by reference to the following description of embodiments of the present disclosure taken in conjunction with the accompanying drawings, wherein.

Although the drawings represent embodiments of the various features and components according to the present disclosure, the drawings are not necessarily to scale and certain features may be exaggerated in order to better illustrate and explain the present disclosure. The exemplification set out herein illustrates embodiments of the disclosure, and such exemplifications are not to be construed as limiting the scope of the disclosure in any manner.

DETAILED DESCRIPTION OF EMBODIMENTS

For the purpose of promoting an understanding of the principles of the disclosure, reference will now be made to the embodiments illustrated in the drawings, which are described below. It will nevertheless be understood that no limitation of the scope of the disclosure is thereby intended. The disclosure includes any alterations and further modifications in the illustrated device and described methods and further applications of the principles of the disclosure, which would normally occur to one skilled in the art to which the disclosure relates. Moreover, the embodiments were selected for description to enable one of ordinary skill in the art to practice the disclosure.

Figure 1:
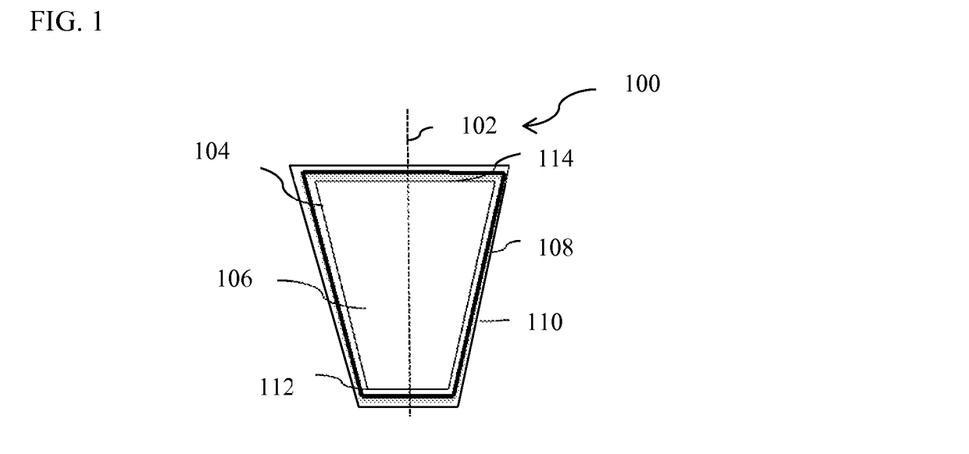
FIG. 1 is a sectional, side-view showing a pin.

Referring now to FIG. 1, a pin 100 according to one embodiment of the present disclosure is depicted as including a central axis 102, a generalized conical body 104, a solid metal core 106, a coating 108, a flux coating 110, a first end 114 of conical body 104, and a second end 112 of conical body 104. In this embodiment, conical body 104 has a cross-sectional area that decreases with distance from first end 114 to second end 112. Coating 108 is applied onto the surface of conical body 104. Coating 108 is made of a material that has a melting temperature that is lower than a melting temperature of conical body 104. The melting temperature of coating 108 is also lower than a frictional temperature (described below) created by the forcible insertion of conical body 104 into a hole formed at a location of a defect of a component. Also, the melting temperature of conical body 104 is higher than the frictional temperature. The frictional temperature is the temperature value that exists at the interface of pin 100 and the component which is being repaired when pin 100 is inserted into the component. In one embodiment, the melting temperature of coating 108 is within a brazing range of temperature values, which range has a lower value of 800 deg. F in the United States and 842 deg. F in much of the rest of the world, and in this context, an upper value of the melting temperature of the material of conical body 104 or the base material of the component being repaired, whichever is lower.

In other embodiments, coating 108 is not used. Instead, the materials and/or surface geometry of conical body 104 may be sufficient for certain applications (e.g., to repair defects in Aluminum components) to create enough frictional heat during insertion to create a high tensile strength bond between body 104 and the component being repaired.

In one embodiment of the present disclosure, the material used to make pin 100 depends on the ductility of both solid metal core 106 and the material of the component with the defect, which may be cast iron, aluminum, steel, etc. For example, to repair defects in cast iron, brass or bronze may be used to make solid metal core 106, since they both have high ductility; however, the repair may have aesthetic concerns. More specifically, as brass and bronze are essentially yellow in color, and cast iron is gray, use of such pins may result in a color contrast in the repaired component that highlights the fact that the component has been repaired. Additionally, in one embodiment, for a cast iron repair, steel alloy having a thermal expansion coefficient that matches the cast iron may be used since it has a high ductility. In this embodiment, the color of steel closely matches that of cast iron. Also, the repair location may be treated with a needle scaler to create a surface texture on the installed pin(s) that blends well with the surface texture of the repaired component. The thermal expansion coefficient of the selected steel alloy depends on the application. For many applications, the natural values of mild to moderately alloyed steels are sufficiently close to that of cast iron. For high-temperature applications (e.g., exhaust manifolds, cylinder head combustion faces, etc.), the match in thermal expansion coefficients may need to be manipulated across the operating temperature range of the repaired component by alloy composition of the pin material. In many instances, a thermal expansion coefficient difference between the pin material and the component material of 10% to 20% is a sufficient match.

In one embodiment of the present disclosure, generalized conical body 104 may have different geometries. For example, generalized conical body 104 may be have an elliptical cross-section (taken perpendicularly through axis 102), a polygon cross-section having multiple sides such that the overall shape remains substantially conical, a circular cross-section, other convex cross-sections, or concave cross-sections. In other embodiments of the present disclosure, generalized conical body 104 has an irregular outer surface, such that the outer surface is not smooth. The irregularity is achieved by creating ribs on the outer surface, for example, concentric ribs perpendicular to central axis 102, helical ribs in the thread-in direction of pin 100, helical ribs opposite the thread-in direction, bumps, or other surface geometries, such as at least one protrusion on the outer surface of pin 100. It should be understood that while conical body 104 is described herein as having a decreasing cross-section from end 114 to end 112, in certain embodiments, the above-described surface characteristics interrupt a continuous decrease in cross-section from end 114 to end 112. Such surface geometries will enhance surface temperature generation in response to the forcible insertion of generalized conical body 104 into the component. In one embodiment, this irregular surface geometry is formed on the outer surface of pin 100 and/or on coating 108. The irregularity on the outer surface of pin 100 and/or on coating 108 is helpful to initiate the softening of coating 108 during the repair process as described below.

In one embodiment, flux coating 110 is applied onto coating 108. In other embodiments, flux coating 110 may be applied to holes formed in the component to be repaired as described below. Flux coating 110 is used, for example, for removing surface contamination that may exist when the bond is formed between pin 100 and the component. Flux coating 110 may include braze-like materials to assist bonding, fluxes to de-oxidize and protect the surfaces, wetting agents, and friction modifiers. In certain embodiments, these may be sacrificial materials that catalyze the process as they are squeezed out. For the high strength bonds, it may be desirable to keep oxygen away from the bond as it is being formed. This can be accomplished via the design of flux coating 110 and/or shielding layers/gasses as is done with shielded gas welding. For example, if a repair area is flooded with Argon gas, then the Oxygen is displaced and no harmful oxides of pin 100, coating 108 or the base material of the component being repaired are formed during heating of pin 100 and the component during installation. Some flux materials outgas in a way that serves to protect the bond as it is being formed in a similar manner, and may be useful as flux coating 110 when the region of repair is relatively quiescent so that the shielding gasses are not "blown away."

Figure 1A:
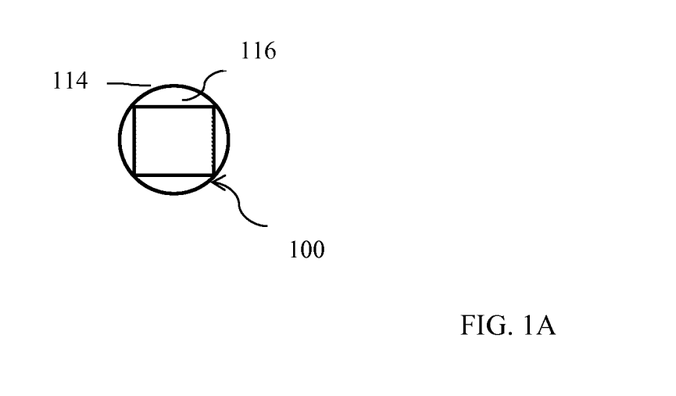
FIG. 1A is a top view of the pin of FIG. 1.

Referring now to FIG. 1A, in one embodiment of the present disclosure, pin 100 includes a drive element 116 adjacent to first end 114 of generalized conical body 104. Drive element 116 is configured to cooperate with a tool to cause rotation of generalized conical body 104 into the component. In certain embodiments, drive element 116 is configured to break if the torque that is applied to drive element 116 exceeds a predetermined limit. In general, given the axial and torque loads applied during installation of pins 100, drive element 116 may be best implemented as features on the outer diameter of first end 114 of body 104, such as depicted in FIG. 1A. Drive element 116 may take any shape, however, that permits transfer of large axial and torque loads from drive surface of a tool to conical body 104. Any of a variety of External TORX™ and/or Polygon Drive geometries having large capacity may be used. In other embodiments, drive element 116 may be configured to mate with a drive surface of a tool, such as a slotted, Phillips or Robertson screw driver, and drive element 116 may extend from generalized conical body 104. A frangible connection between drive element 116 and generalized conical body 104 may be formed to break when the torque force applied to element 116 by the tool exceeds the predetermined limit, thereby eliminating the need to use expensive torque drives or to otherwise measure and control the amount of torque applied to generalized conical body 104.

Figure 2:
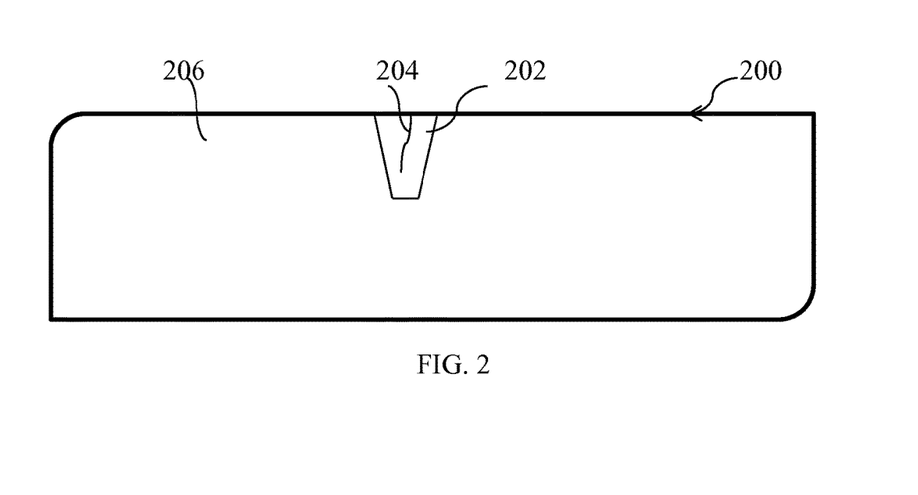
FIG. 2 is a cross-sectional side view of a defect in a component and a conical hole located at the defect.
Figure 2A:
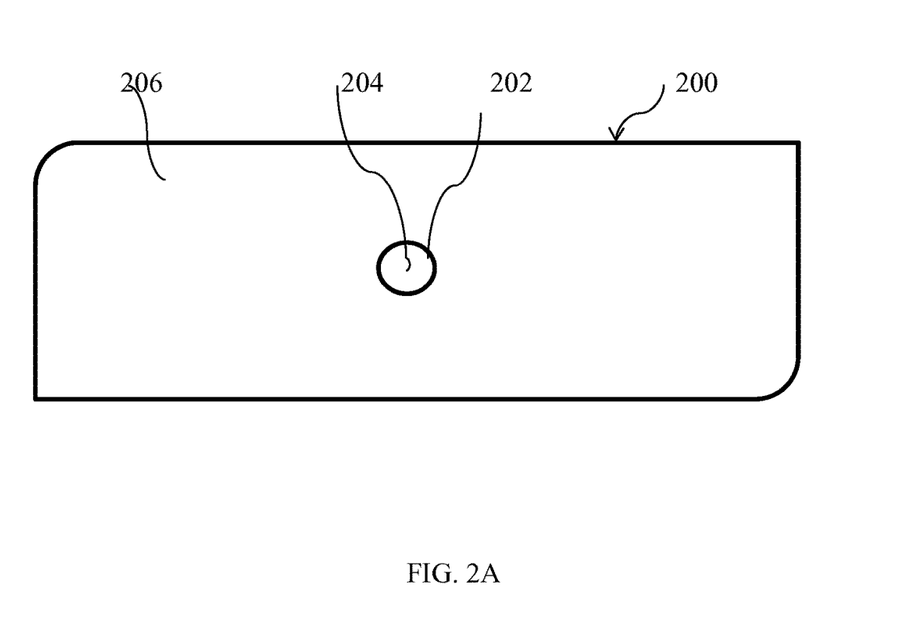
FIG. 2A is a top view of FIG. 2.

Referring now to FIG. 2, a defect 204 of a component 200 is depicted as being replaced by a conical hole 202 formed at a location of defect 204 according to one embodiment of the present disclosure. Component 200 further includes a base material 206. In general, defect 204 includes any imperfection on component 200, such as a crack, a dent, a point defect, or a damage area of any size, or an imperfection due to a faulty manufacturing process. Conical hole 202 is created at the location of defect 204 to remove defect 204. All holes in all embodiments disclosed herein can be formed using any of a variety of drilling, boring, or other methods—automatic, manual, or combination thereof. While hole 202 is shown as extending into, but not through component 200, in certain embodiments hole 202 will extend through component 200 and create an opening on the opposite side of component 200. In one embodiment of the present disclosure, conical hole 202 has a similar geometrical shape as that of generalized conical body 104 such that its cross-section conforms to a corresponding cross-section of conical hole 202. FIG. 2A depicts a top view of defective component 200 having conical hole 202 formed at the location of defect 204. It should be understood that while defect 204 is shown in FIGS. 2 and 2A, when conical hole 202 is formed, defect 204 is removed from component 200.

Figure 3:
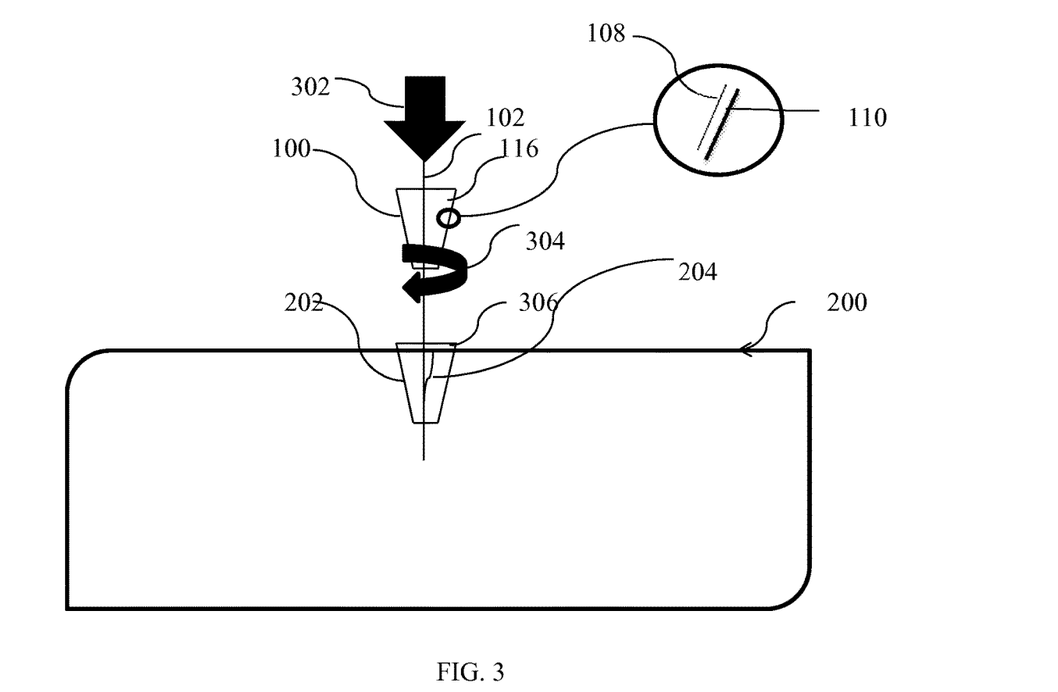
FIG. 3 is a cross-sectional, conceptual view of installing a coated conical pin into a conical hole.

Referring now to FIG. 3, installation of a coated generalized conical pin 100 is depicted. Like components have been given the same reference designations. According to one embodiment of the present disclosure, generalized conical pin 100 is forcibly inserted into conical hole 202. In all embodiments disclosed herein various processes can be used to forcibly insert generalized conical pin 100 into conical hole 202, for example, by applying an axial (or thrust) load, a torque load, an axial load and torque load, by force fitting pin 100 into hole 202, by applying a reciprocating motion, and any combination thereof, all of which will generate frictional heat.

In one embodiment of the present disclosure, a torque load 304 and a thrust load 302 are applied to drive element 116 to insert generalized conical pin 100 into conical hole 202. In some embodiments, drive element 116 is configured to break if torque load 304 exceeds a predetermined limit. When generalized conical pin 100 is rotated into conical hole 202, heat generated from friction between pin 100 and the surface of hole 202 causes coating 108 to soften and reharden thereby forming a bond between component 200 and generalized conical pin 100. Coating 108 comprises a material that has a bond strength value (when softened and rehardened) having a tensile strength value at the bond between base material 206 and generalized conical pin 100 that is sufficiently high to restore the original function of base material 206 at the location of defect 204. In some instances, the tensile strength value of the bond is a substantial percentage of a tensile strength value of base material 206. Many commercial brazing materials may be suitable for coating 108 including a range of Copper-based alloys, as well as Silver-based alloys.

Figure 3A:
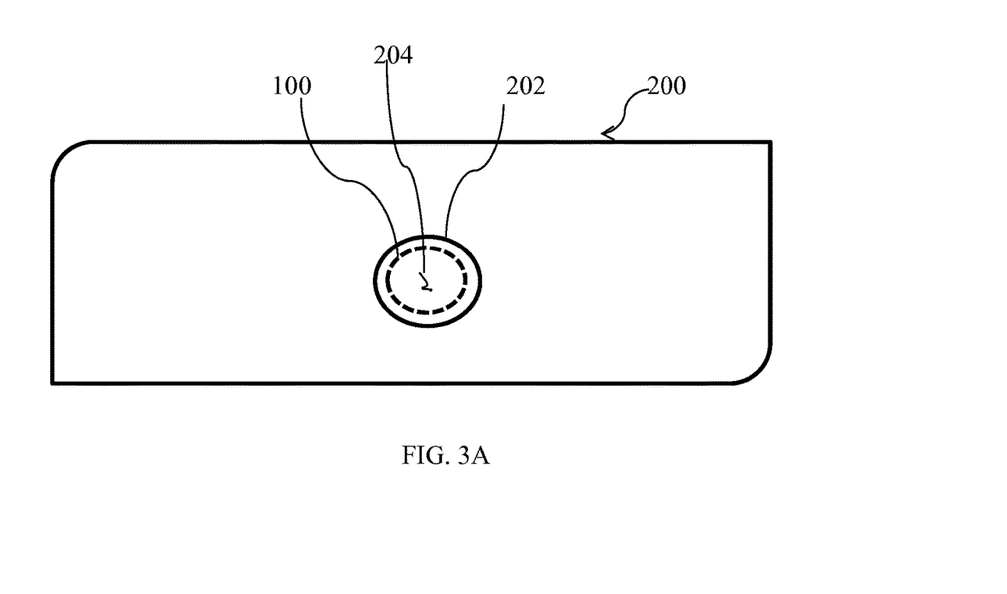
FIG. 3A is a top view of an installed coated conical pin.

In embodiments of the disclosure, a protruding top 306 of generalized conical pin 100 that extends above the surface of component 200 remains after insertion of conical pin 100 into conical hole 202. In such embodiments, protruding tops 306 are removed. All protruding tops 306 of generalized conical pins 100 can be removed using various material removal methods—automatic, manual, or combinations thereof—such that the remaining upper surfaces of pins 100 are flush with the surface of component 200. As indicated above, in some applications, pins 100 are installed in holes 202 that extend through component 200. In these applications, protrusions may exist at both ends of pins 100 after insertion. Either or both of such protrusions may be removed in the manner described above. In one embodiment of the present disclosure, it is ensured that generalized conical pin 100 is well-aligned with conical hole 202. This can be achieved by different processes, for example, by using a multi-axis radial arm drill, using narrow cone angles, etc. FIG. 3A depicts a top view of repaired component 200 after installation of generalized conical pin 100 into conical hole 202.

Figure 4:
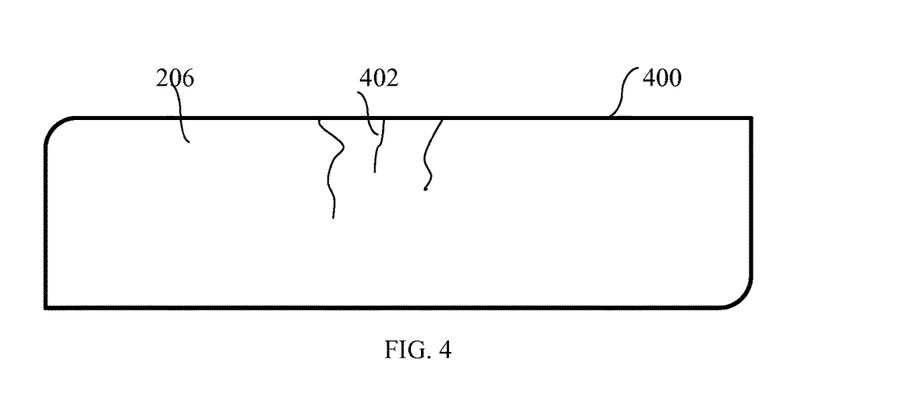
FIG. 4 is a cross-sectional side view of another defect in a component.
Figure 4A:
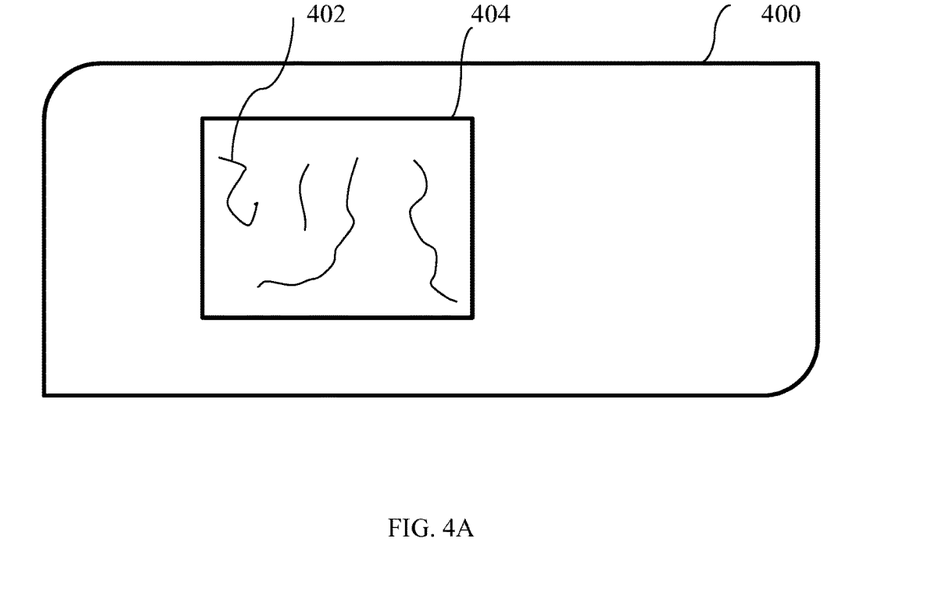
FIG. 4A is a top view of a large defect in a component having a void formed therein.

Referring now to FIGS. 4 and 4A, a component 400 having a large defect 402 is shown. As best shown in FIG. 4A, large defect 402 in this example includes a cluster or localize group of imperfections in component 400. In one embodiment of the disclosure, a void 404 is created to remove large defect 402 in component 400. One having the ordinary skill in the art will realize that various methods—automatic, manual, or combination thereof—can be used to create void 404 to remove large defect 402 from component 400.

Figure 4B:
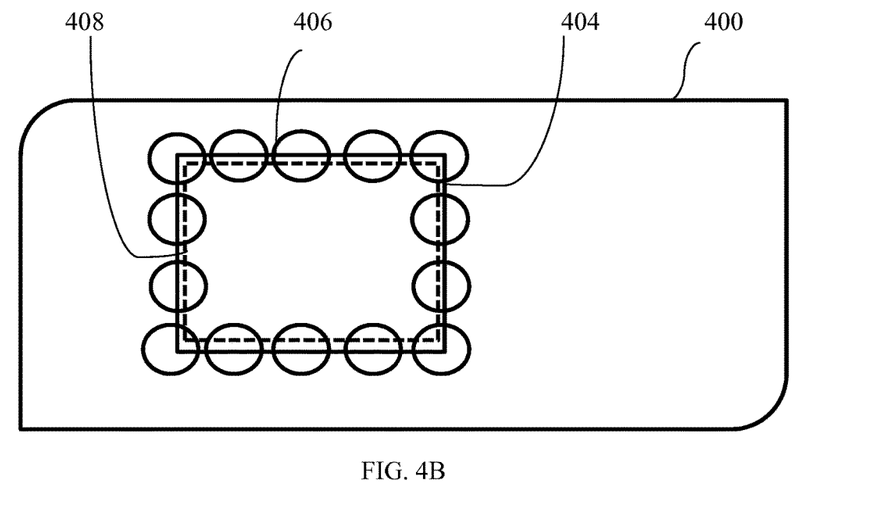
FIG. 4B is a top view of the component of FIG. 4A at one stage in a repair process according to the present disclosure.

Referring now to FIG. 4B, after void 404 is created to remove defect 402, an insert 408 is placed into void 404. Insert 408 is created of similar material as component 400 and of similar shape and size as that of void 404. Insert 408 may be, for example, created of pieces of a scrap material from component 400 or other components of the same material, and machined to a similar shape as void 404. After insert 408 is installed, a first plurality of conical holes 406 are created along the perimeter of insert 408 (i.e., the junction between insert 408 and void 404). In this example, each conical hole 406 has the same diameter. The distance between each adjacent conical hole 406 is less than the diameter of conical holes 406.

Figure 4C:
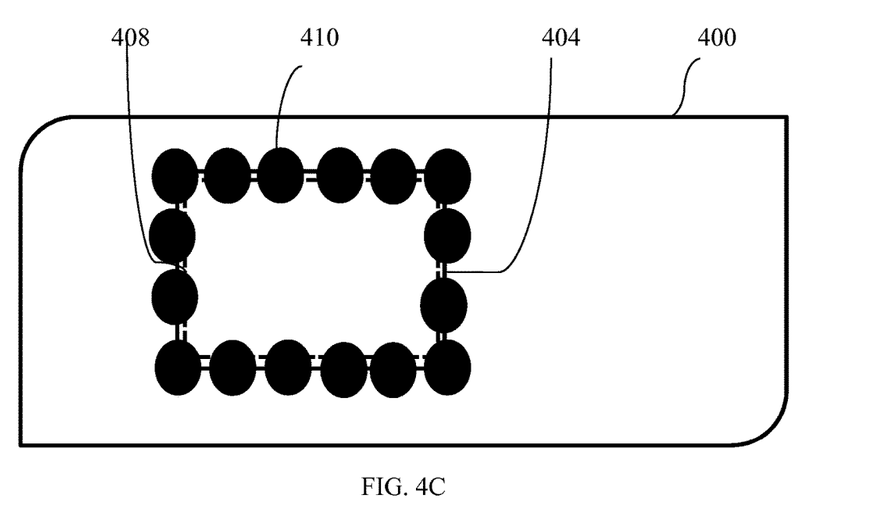
FIG. 4C is a top view of the component of FIG. 4A at another stage in a repair process according to the present disclosure.
Figure 4D:
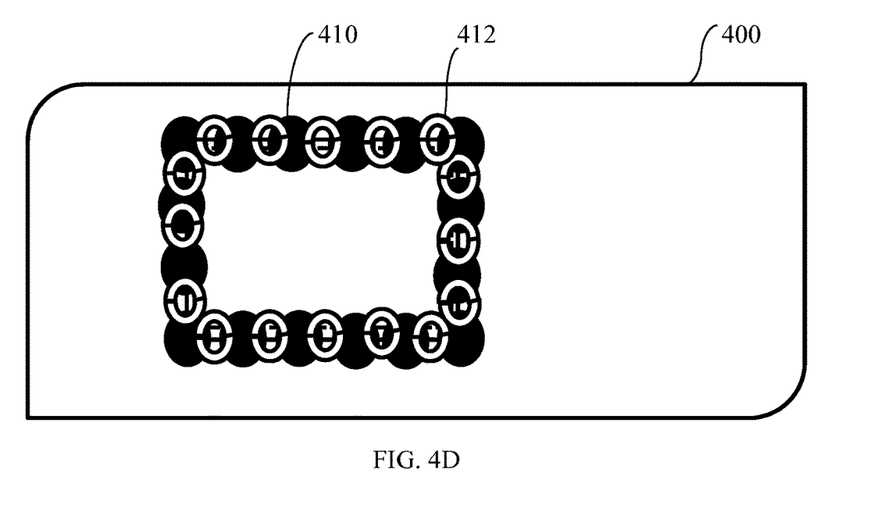
FIG. 4D is a top view of the component of FIG. 4A at another stage in a repair process according to the present disclosure.
Figure 4E:
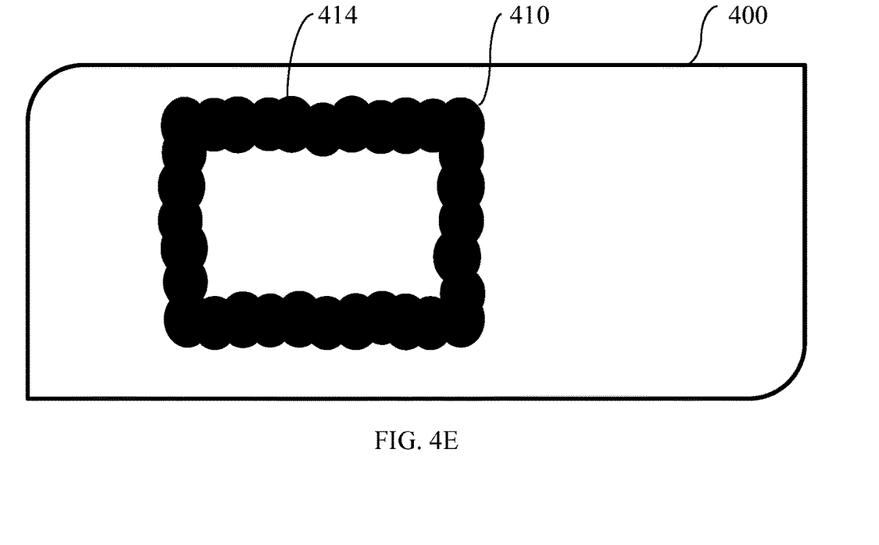
FIG. 4E is a top view of the component of FIG. 4A at another stage in a repair process according to the present disclosure.

Referring now to FIG. 4C, component 400 is depicted as including a first plurality of generalized conical pins 410 which have been are forcibly inserted into the first plurality of conical holes 406. Conical pins 410 may each include drive element 116 and coating 108 as discussed above with reference to FIG. 3. FIG. 4D depicts component 400 after a second plurality of conical holes 412 are formed along the perimeter of insert 408. As shown, each of second plurality of conical holes 412 overlaps adjacent pins of first plurality of generalized conical pins 410. As should be understood from the foregoing, the inner surfaces of the first plurality of conical holes 406 consist entirely of the base material of component 400. As the second plurality of holes 412 are formed partly into the base material of component 400 and partly into the first plurality of conical pins 410, the inner surfaces of the second plurality of holes consists partly of the base material of component 400 and partly of the base material of pins 410. As such, coating 108 for the second plurality of conical pins 414 (discussed below) may be different from coating 108 for pins 410 and may be selected to bond to both materials. In FIG. 4E, a second plurality of generalized conical pins 414 are shown after being forcibly inserted into conical holes 412. Conical pins 410 may each include drive element 116 and coating 108 as discussed above with reference to FIG. 3. In embodiments of the disclosure, protruding tops of conical pins 410 and 414 that extend above the surface of component 400 are removed.

Figure 5:
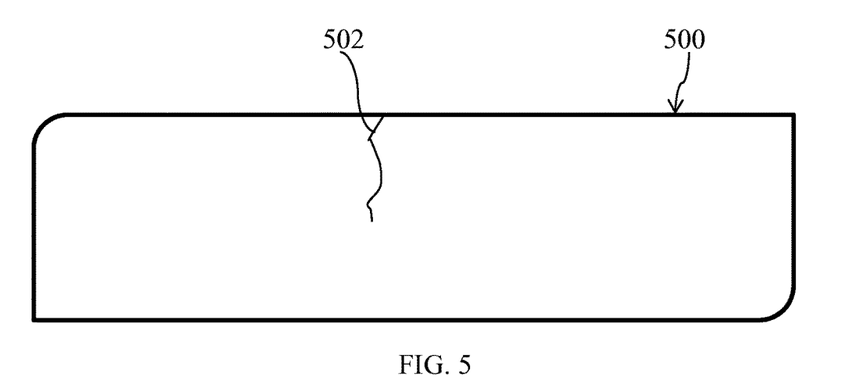
FIG. 5 is a cross-sectional view of a defective portion of a component.
Figure 5A:
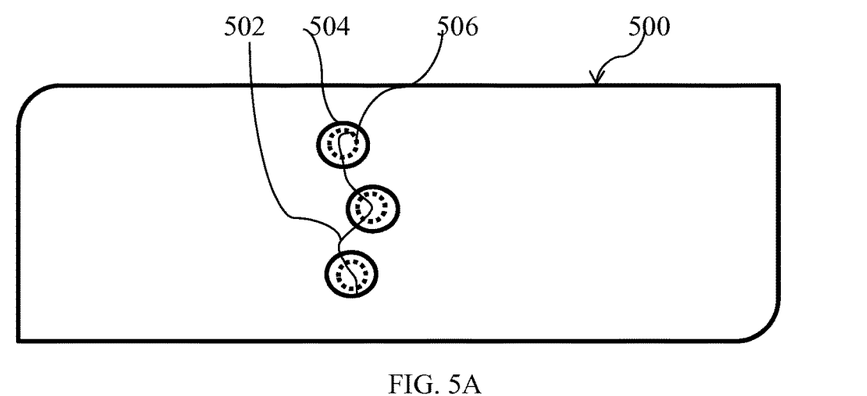
FIG. 5A is a top view of the defective component of FIG. 5, depicting on stage in a repair process according to the present disclosure.

Now referring to FIG. 5, a cross-sectional side view of a component 500 having a defect or crack 502 is shown. As best shown in FIG. 5A, crack 502 extends a distance along component 500 that is greater than the diameter of a conical pin. Accordingly, to repair crack 502, a plurality of conical holes 504 (each having the same diameter) are created along crack 502, such that the distance between each adjacent conical holes 504 is less than the diameter of the holes 504. Next, a first plurality of generalized conical pins 506 are forcibly inserted into conical holes 504 in the manner described above. Each conical pin 506 may include drive element 116 and coating 108 as discussed above with reference to FIG. 3.

Figure 5B:
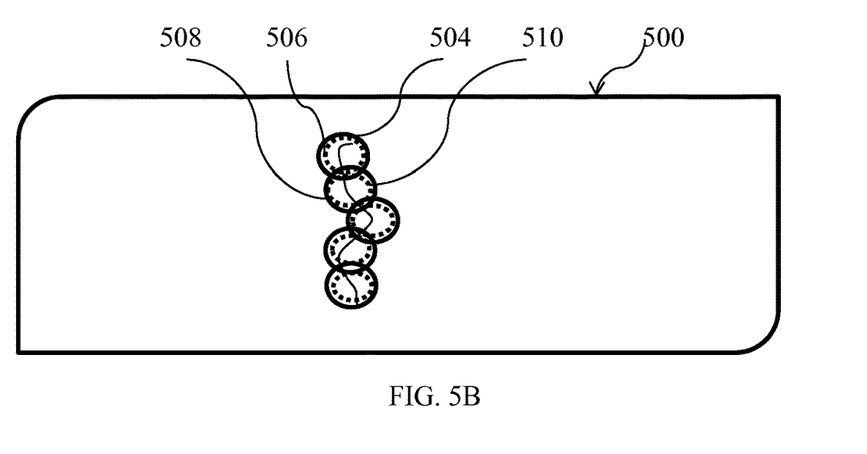
FIG. 5B is a top view of the component of FIG. 5 at another stage in a repair process according to the present disclosure.

Next, as depicted in FIG. 5B, a second plurality of generalized conical pins 510 are forcibly inserted into conical holes 508. Each conical pin 510 may include drive element 116 and coating 108 as discussed above in FIG. 3. In embodiments of the disclosure, protruding tops of generalized conical pins 506 and 510 that extend above the surface of component 500 are removed.

As should be apparent from the foregoing, the methods and apparatuses described herein permit repairs of defects in components by rapidly achieving a desired temperature value of a pin coating without imparting appreciable heat to the pin body and without appreciable heat transfer to the base material of the component being repaired. As a result of the very rapid heating and subsequent cooling (the coating temperature quenches into the pin and the base material of the component, damage to the base material is within acceptable limits. There are no gross displacements loading to graphite flake motion or realignment. The base material of the component being repaired experiences very little high temperatures, both spatially and temporally, so the time constants associated with large-scale micro-structure changes are not reached. Consequently, the disclosed pins when installed according to the disclosed methods may achieve much higher tensile strength as compared to conventional methods of repair.

While the embodiments have been described as having exemplary designs, the present disclosure may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this invention pertains.

The invention claimed is:

1. A pin, comprising:
  a conical body having a central axis and a cross-sectional area at a first end that is less than a cross-sectional area at a second end; and
  a coating applied to the conical body and having a coating melting temperature within a range having a lower value of about 800 degrees Fahrenheit and an upper value that is lower than a body melting temperature of the conical body;
  wherein the coating comprises a material having a bond strength value comprising a first tensile strength value of a bond formed between the conical body and at least one of a base material of a component to be repaired and another pin in response to softening and rehardening of the coating as a result of forcibly positioning the conical body into a hole formed in the base material, the first tensile strength value being sufficiently high to restore an original function of the base material at the hole; and
  wherein the conical body includes an outer surface having a plurality of ribs to enhance surface temperature generation in response to the forcible positioning of the conical body into the hole.

2. The pin of claim 1, wherein the conical body comprises a solid metal core having a first thermal expansion characteristic that is substantially the same as a second thermal expansion characteristic of the base material.

3. The pin of claim 1, wherein the coating melting temperature comprises a brazing range temperature value.

4. The pin of claim 1, further comprising a flux layer applied to the coating.

5. An article of manufacture, comprising:
  a generalized cone body comprising a first end and a second end, the generalized cone body having a decreasing cross-sectional area from the first end to the second end, the generalized cone body comprising a body melting temperature and having an outer surface with a plurality of ribs; and
  a coating coupled to a boundary of the generalized cone body, the coating having a coating melting temperature within a range having a lower value of about 800 degrees Fahrenheit and an upper value that is lower than the body melting temperature;
  wherein the coating melting temperature is greater than an operating temperature of the component and sufficiently low so as to allow the coating to plasticize when the generalized cone body is forcibly positioned into a component to repair a defect; and
  wherein the plurality of ribs enhance surface temperature generation in response to the forcible positioning of the generalized cone body into the component.

6. The article of manufacture of claim 5, wherein the generalized cone body comprises a cross-sectional shape selected from the cross-sectional shapes consisting of: a circle, an ellipse, a polygon, and a non-convex set.

7. The article of manufacture of claim 5, wherein the generalized cone body comprises a drive element adjacent the first end, the drive element being configured to cooperate with a tool to cause rotation of the generalized cone body into a conical hole, and to break in response to torque applied to the drive element by the tool in excess of a predetermined limit.

8. An article of manufacture, comprising:
  a generalized cone body comprising a first end and a second end, the generalized cone body having a decreasing cross-sectional area from the first end to the second end, the generalized cone body comprising a second melting temperature; and
  a coating coupled to a boundary of the generalized cone body, the coating comprising a first melting temperature that is lower than the second melting temperature and a friction temperature generated by insertion of the generalized cone body into a component to be repaired, the friction temperature being a temperature value locally generated at an interface of the coating and the component and sufficient to plasticize the coating when the generalized cone body is forcibly positioned into the component to repair a defect;

wherein the first melting temperature is greater than an operating temperature of the component; and wherein the generalized cone body comprises a drive element adjacent the first end, the drive element being configured to cooperate with a tool to cause rotation of the generalized cone body into a conical hole, and to break in response to torque applied to the drive element by the tool in excess of a predetermined limit.

9. The article of manufacture of claim 8, wherein the coating comprises a material having a bond strength value comprising a first tensile strength value of a bond formed between the generalized cone body and a material surrounding the conical hole in response to softening and rehardening of the coating as a result of rotating the generalized cone body into the conical hole, the first tensile strength value being sufficiently high to restore an original function of the material at the conical hole.

10. The article of manufacture of claim 8, wherein the generalized cone body includes an outer surface having a plurality of ribs to enhance surface temperature generation in response to rotating the generalized cone body into the conical hole.

11. The article of manufacture of claim 8, wherein the generalized cone body comprises a solid metal core having a first thermal expansion characteristic that is substantially the same as a second thermal expansion characteristic of the material surrounding the conical hole.

12. The article of manufacture of claim 8, further comprising a flux layer applied to the coating.

13. The article of manufacture of claim 8, wherein the generalized cone body comprises a cross-sectional shape selected from the cross-sectional shapes consisting of: a circle, an ellipse, a polygon, and a non-convex set.

* * * * *